United States Patent
Gerard et al.

(10) Patent No.: US 10,832,554 B1
(45) Date of Patent: Nov. 10, 2020

(54) SENSOR VECTORS BASED ON ACTIVATIONS OF SENSORS WITH ATTRIBUTES

(71) Applicant: INTERNATIONAL BUSINESS MACHINES CORPORATION, Armonk, NY (US)

(72) Inventors: Scott Gerard, Wake Forest, NC (US); Susann Marie Keohane, Austin, TX (US); Aliza Rivka Heching, Bronx, NY (US); Mohammad Arif Ul Alam, Quincy, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/682,751

(22) Filed: Nov. 13, 2019

(51) Int. Cl.
   *G08B 21/06* (2006.01)
   *H04L 29/08* (2006.01)
   *G06N 20/00* (2019.01)
   *G06N 5/04* (2006.01)

(52) U.S. Cl.
   CPC .............. *G08B 21/06* (2013.01); *G06N 5/04* (2013.01); *G06N 20/00* (2019.01); *H04L 67/12* (2013.01)

(58) Field of Classification Search
   None
   See application file for complete search history.

(56) References Cited

U.S. PATENT DOCUMENTS

| | | | | |
|---|---|---|---|---|
| 6,909,921 B1* | 6/2005 | Bilger | ................ | G08B 21/0484 700/19 |
| 2012/0197852 A1 | 8/2012 | Dutta et al. | | |
| 2014/0266669 A1* | 9/2014 | Fadell | ................ | H04L 12/2803 340/501 |
| 2014/0266791 A1* | 9/2014 | Lloyd | ................ | G08B 21/0423 340/870.09 |
| 2017/0206464 A1 | 7/2017 | Clayton et al. | | |
| 2017/0359680 A1* | 12/2017 | Ledvina | ................ | G01S 5/0252 |
| 2019/0013960 A1* | 1/2019 | Sadwick | ............ | H04L 12/2838 |

FOREIGN PATENT DOCUMENTS

CN 202276353 U 6/2012

OTHER PUBLICATIONS

Bhattacharya, "Enabling Sclable Smart-Building Analytics," Technical Report No. UCB/EECS-2016-201, http://www2.eecs.berkeley.edu/Pubs/TechRpts/2016/EECS-2016-201.html, Dec. 15, 2016, 121 pages.

(Continued)

*Primary Examiner* — Brent Swarthout
(74) *Attorney, Agent, or Firm* — Conley Rose, P.C.

(57) ABSTRACT

Aspects of the disclosure provide for a system. In some examples, the system comprises a first sensor associated with first and second attributes and a second sensor associated with the second attribute and a third attribute. The system further comprises a processor communicatively coupled to the first and second sensors. The processor is configured to identify a number of activations of the first sensor within a time window, identify a number of activations of the second sensor within the time window, and construct a sensor vector identifying a number of first attribute activations based on the first number of activations (Continued)

of the first sensor, a number of second attribute activations based on the number of activations of the first sensor and the number of activations of the second sensor, and a number of third attribute activations based on the number of activations of the second sensor.

20 Claims, 6 Drawing Sheets

(56) References Cited

OTHER PUBLICATIONS

Kantoch, "Recognition of Sedentary Behavior by Machine Learning Analysis of Wearable Sensors during Activities of Daily Living for Telemedical Assessment of Cardiovascular Risk," www.mdpi.com/sensors, Sensors 2018, 18, 3219; doi:10.3390/s18103219, 17 pages.

Keohane, et al., "Reflections on the Effectiveness of a High Density Ambient Sensor Deployment for Monitoring Healthy Aging," Springer International Publishing AG, part of Springer Nature 2018, J. Zhou and G. Salvendy (Eds.): ITAP 2018, LNCS 10927, pp. 315-333, 2018, https://doi.org/10.1007/978-3-319-92037-5_24.

Lu, et al., "Sensing Urban Transportation Events from Multi-Channel Social Signals with the Word2vec Fusion Model," www.mdpi.com/journal;sensors, Sensors 2018, 18, 93; doi:10.3390/s18124093, 23 pags.

Mora, et al., "Cloud-Based Behavioral Monitoring in Smart Homes," www.mdpi.com/journal/sensors; Sensors 2018, 18, 1951; doi:10.3390/s18061951, 16 pages.

Uddin, et al., "Ambient Sensors for Elderly Care and Independent Living: A Survey," www.mdpi.com/journal/sensors: Sensors 2018, 18, 2027; doi:10.3390/s18072027, 31 pages.

* cited by examiner

SENSOR VECTORS BASED ON ACTIVATIONS OF SENSORS WITH ATTRIBUTES

BACKGROUND

The present disclosure relates to aggregation of sensor data across a collection of sensors, such as Internet of things (IoT) sensors or devices, and more specifically, to collecting data from sensor monitoring locations, such as homes and/or nursing facilities, and determining the activities or status of occupants.

SUMMARY

Aspects of the present disclosure provide for a system. In at least some examples, the system comprises a first sensor associated with a first attribute and a second attribute, a second sensor associated with the second attribute and a third attribute, and a processor communicatively coupled to the first sensor and to the second sensor. The processor is configured to identify a number of activations of the first sensor within a time window, identify a number of activations of the second sensor within the time window, and construct a sensor vector. The sensor vector identifies a number of first attribute activations based on the first number of activations of the first sensor, a number of second attribute activations based on the number of activations of the first sensor and the number of activations of the second sensor, and a number of third attribute activations based on the number of activations of the second sensor.

Other aspects of the present disclosure provide for a computer program product comprising a computer readable storage medium having program instructions embodied therewith. A processor executing the instructions causes the processor to calculate a first number of activations of a first set of sensors corresponding to a first sensor attribute, wherein the first number of activations takes place in a time window. Executing the instructions further causes the processor to calculate a second number of activations of a second set of sensors corresponding to a second sensor attribute, wherein the second number of activations take place in the time window, wherein the first set of sensors overlaps the second set of sensors, and wherein the first set of sensors and the second set of sensors monitor a location. Executing the instructions further causes the processor to identify a pattern based on the first number of activations and the second number of activations, wherein the pattern corresponds to an activity taking place at the location.

Other aspects of the present disclosure provide for a method. In at least some examples, the method comprises converting sensor data from sensors into a sensor vector including data spanning a time window, wherein the sensor vector includes counts of sensor activations for sensor categories, mapping the sensor vector to sensor points in a multi-dimensional space, and determining clusters of the sensor points in the multi-dimensional space based on a distance between the sensor points.

DETAILED DESCRIPTION

Figure 1:
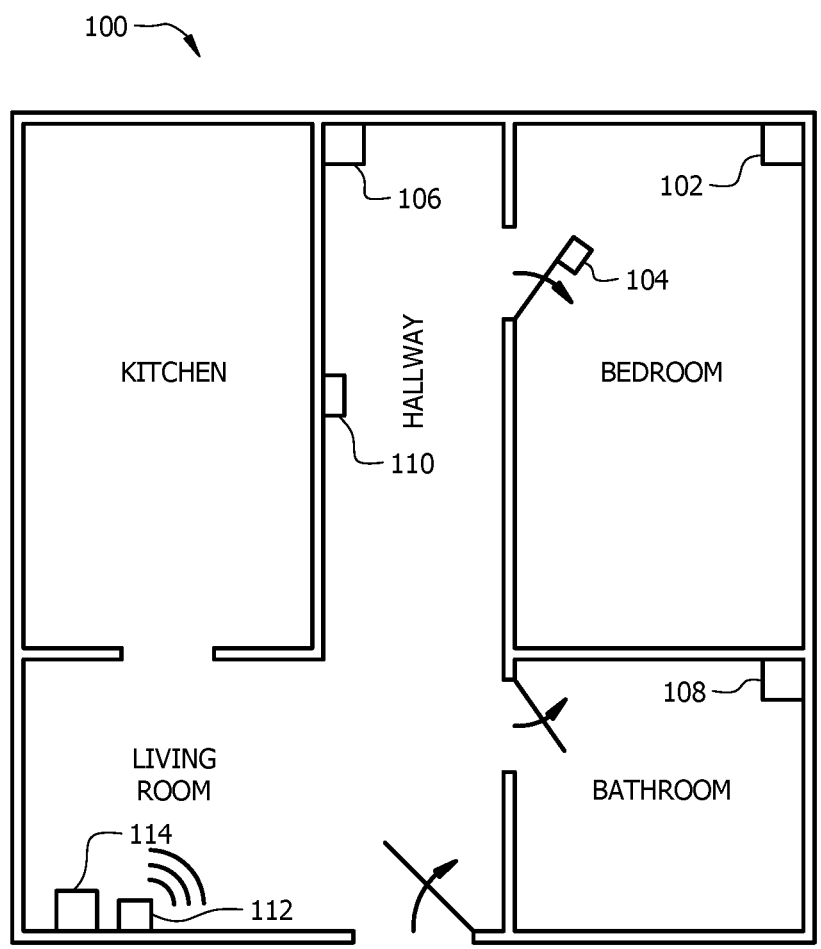
FIG. 1 shows a sensor network in accordance with an example.

As Internet of Things (IoT) technology proliferates, new application environments are identified. Some of these application environments can include eldercare or other healthcare applications. For example, IoT sensors can provide data that may be useful in detecting falls, detecting activities of daily living (ADLs), and/or detecting anomalies from these ADLs or other normal patterns of activity. By applying machine learning to data from these IoT sensors, trends can be determined to aid in the healthcare and/or injury prevention of individuals. However, machine learning generally requires an extensive and/or large data set for training, which may not be uniquely available for each home that utilizes IoT sensors for this purpose or may take a prohibitively large amount of time to collect for each home that utilizes IoT sensors for this purpose. Accordingly, an ability to aggregate sensor data across multiple similar implementation locations (e.g., use data learned from IoT sensors of one implementation location in training a machine learning system for another implementation location). However, each IoT sensor may be identified by its own unique sensor identifier (sensorId), which can create difficulty in aggregating sensor data across multiple similar implementation locations.

Aspects of the present disclosure provide for a machine learning system and process for aggregating sensor data across multiple similar implementation locations. In at least some examples, the aggregated data enables machine learning training across the implementation locations where sensor data from each individual implementation location is insufficient on its own for machine learning training for that respective implementation location. This machine learning across multiple implementation locations is, in some examples, referred to as transfer learning. To enable the aggregation, at least some aspects of the present disclosure provide for generation of a sensor-term vector. The sensor-term vector is uniquely generated for each IoT sensor, where similar sensor-term vectors for sensors in different implementation locations are similar or "close" to each other according to cosine similarity. In at least some examples, procedures such as a word2vec exist for generating vectors from data (e.g., such as multiple text documents). Using word2vec, a corpus of text is received and a vector space is generated, often having hundreds, if not thousands, of dimensions. Unique words in the corpus are mapped to a uniquely corresponding vector in the vector space and the word vectors are positioned in the vector space so that words that share commonalities are located "close" to one another in the vector space. However, because each IoT sensor has its own unique sensorId, difficulty arises in generating a vector from the IoT sensor data. For example, simply applying a technique such as word2vec on its own to the IoT sensor data would be, at a conceptual level, similar to attempting to identify overlapping words or commonalities in vectors derived from documents written in entirely different languages.

To solve at least some of the problems associated with generation and analysis of vectors of IoT sensor data, the sensor-term vectors are generated by constructing a set of sensor-terms. The sensor-terms may each describe an attribute that may be attributed to a sensor and the attributes may be further categorized. A sensor may leave some categories of attributes blank. The creation of the categories and attributes may be performed manually as part of building a specification. The specification may be part of a standard used across an industry or a particular manufacturer, or the specification may be designed for a particular job or client. Assigning attributes to the sensors may be performed manually, such as when the sensors are being installed in certain locations. For example, construction of the set of sensor-terms may be performed once per domain. Alternatively, in some examples the construction of the set of sensor-terms may be repeated one or more times based on any suitable trigger for re-constructing the set of sensor-terms. The sensor-terms are, in some examples, plain English words that are self-describing and represent hierarchical and/or ontological domain-specific attributes. In other examples the sensor-terms are, or include, other data such as integers, a universally unique identifier (UUID), or any other suitable data. In some examples, the sensors may have inherent attributes, such as the measurement type. The sensors may be able to communicate their attributes to a processor or other computing device. Communication of attributes may include a measurement type attribute that is inherent to the sensor. In various examples, the sensors may be programmed with other attribute information when they are installed and communicate those attributes to a processor or computing device.

In various examples, there may be categories of attributes, such as facility type, room role, measurement type, furniture, activity, or other custom categories. The facility type category may have attributes such as a home, an independent living facility, an assisted living facility, or a skilled nursing facility. The room role category may have attributes such as bedroom, bathroom, kitchen, living room, or outside. The measurement type category may have attributes such as motion, acceleration, contact, temperature, humidity, carbon dioxide, pressure, noise, power consumption, heart rate, respiration rate, or sleep stage. The furniture category may have attributes such as bed, closet, dresser, toilet, shower, bathroom sink, kitchen sink, kitchen door, kitchen cabinet, scooter, wheelchair, television, radio, microwave, telephone, computer, entry/exit, or door. In various examples, an attribute may have sub-attributes. The bed attribute may have sub-attributes, such as indicating a king, queen, double, twin, or other bed size. A category, such as furniture, may have a mobility attribute with sub-attributes such as scooter, wheelchair, walker, or cane. The activity category may have attributes such as toileting, bathing, eating, moving, dressing, or grooming. Various other category types, or attributes for category types, may be further included in the set of sensor-terms.

After the set of sensor-terms is constructed, sensor-terms are mapped to IoT sensors in an implementation location. For example, a sensor mapping table is generated mapping each individual sensor (e.g., as identified by a globally unique sensorId) in an implementation location to one or more sensor-terms of one or more sensor attributes. Based on the set of sensor-terms that is constructed on a domain-wide basis, sensors similarly located but in different implementation locations have a similar mapping between sensor-term and sensorId.

Subsequently, sensor readings from the sensors are divided into time windows of a fixed size, such as 30 second windows, 1 minute windows, etc. A "bag of sensors" vector is then generated for each time window, where a time window serves as one document for analysis and each document is regarded as one sample for analysis. The bag of sensors vector, in at least some examples, indicates that the vector is agnostic to a sequence or order of sensor readings or a relationship among sensors. A value of a sensor vector for a document is determined by an intensity of actions related to a particular sensor. This intensity is, in some examples, determined according to a count of a number of triggers, or detections, of each sensor belonging to the document. For example, if a document includes a time window that includes 1 detection by a bedroom door sensor, 3 detections by a bedroom ceiling motion sensor, and 1 detection for a TV sensor, a sensor vector of the document may be [sensorId-door=1, sensorId-clbed=3, sensorId-tv=1], where each sensorId of the sensor vector is the globally unique identifier of a respective sensor that made a detection being recorded. For the above example, assume the sensor sensorId-door is mapped to sensor-terms Accelerometer, Bedroom, and Door, the sensor sensorId-clbed is mapped to sensor-terms Bed, Bedroom, and Motion, and the sensor sensorId-tv is mapped to the sensor-terms Bedroom, Plug, and TV. The sensor vector is then converted to a sensor-term vector by increasing a sensor-term count in the sensor-term vector by the number of detections for a sensor mapped to a given sensor-term. In some examples, the numerical values included in the sensor vector are the weights for determining the sensor-term vector. For the above sensor vector, the sensor-term vector, in at least some examples, becomes [Accelerometer=1, Bed=3, Bedroom=5, Door=1, Plug=1, Motion=3, TV=1].

Sensor-term vectors for a plurality of implementation locations may be aggregated to facilitate transfer learning among the implementation locations. However, sensorId to sensor-term mappings, as well as the set of sensor-terms, may vary in some regard from one implementation location to another, for example, based on installer preference when installing, setting up, initializing, etc. the sensors at the implementation locations. To compensate for this potential variation, the sensor mapping tables of sensorId to sensor-term mappings for each implementation location may be normalized. The normalization may be performed according to any suitable normalization scheme, such as term frequency-inverse document frequency normalization, entropy normalization, correlation-based normalization, positive pointwise mutual information normalization, etc. In at least some examples, sensor-terms that are very common among the sensor mapping tables (e.g., Motion) may have a comparatively low normalization factor while sensor-terms that are uncommon among the sensor mapping tables (e.g., TV) may have a comparatively high normalization factor. The values of the sensor-terms of the sensor term-vector are multiplied by their respective normalization factors to normalize the sensor-term vector. Subsequently, a latent space is defined and a latent space dimensional sensor-term vectors and sensor vectors are generated to facilitate further processing of the latent space dimensional sensor vectors, such as via a neural network, to learn from and/or take actions based on the sensor data and resulting latent space dimensional sensor vectors or latent space dimensional sensor-term vectors.

Turning now to FIG. 1, an illustrative sensor network 100 in accordance with an example is shown. In at least some examples, the sensor network 100 is illustrative of an implementation location for one or more sensors. The implementation location is generally representative of a physical location such as a building, a portion of a building, or an outdoor area having some physical boundary. For ease of description and understanding, the sensor network 100 is described in reference to an implementation location of a private single-person house. In some examples, the sensor network 100 includes a sensor 102, a sensor 104, a sensor 106, a sensor 108, and a sensor 110 (collectively, the sensors 102-110). In some examples of the sensor network 100, a wireless access point 112 communicatively couples at least some of the sensors 102-110 to a computing device 114. In some implementations, the computing device 114 is located within the implementation location of the sensor network 100 (e.g., located in a house that is monitored by at least some of the sensors 102-110). In other examples, the computing device 114 is located remotely, such that the sensors 102-110 communicate with the computing device 114 via a wide area network such as the Internet. For example, in some implementations the computing device 114 is a cloud computing system and/or a component (such as a node) of a cloud computing system.

Each of the sensors 102-110 monitors one or more aspects of the implementation location. In one example, the sensor 102 is a motion sensor positioned in a bedroom, the sensor 104 is a contact and/or acceleration sensor positioned on a door of the bedroom, sensor 106 is a motion sensor located in a hallway connecting the bedroom to a bathroom, the sensor 108 is a motion sensor located in the bathroom, and the sensor 110 is a noise sensor positioned in the hallway connecting the bedroom to the bathroom. Each of these sensors is assigned a globally unique sensorId, as discussed above, and is mapped to one or more sensor-terms. The sensorId is, in some examples, hardcoded to the respective sensors 102-110 at a firmware or hardware level such that the sensorId is unchangeable. The mapping of the sensorIds to the sensor-terms is performed, in at least some examples, by or through use of the computing device 114. For example, the computing device 114 may automatically map the sensor-terms to the sensorIds or a user may map the sensor-terms to the sensorIds, such as at a time of installation of the sensor network 100, a time of installation of one or more of the sensors 102-110, or a time of initialization or reconfiguration of the sensor network 100. Similarly, and also as discussed above, the sensor-terms may be defined by a user, such as at a time of installation of the sensor network 100. An example sensor mapping table for the sensors 102-110 is shown below in Table 1.

TABLE 1

| sensorId | sensor-term(s) |
| --- | --- |
| sensor102 | Bedroom, Bed, Motion |
| sensor104 | Bedroom, Door, Accelerometer, Contact |
| sensor106 | Hallway, Motion, Moving |
| sensor108 | Bathroom, Motion, Toileting, Bathing |
| sensor110 | Hallway, Noise |

In at least some examples, the computing device 114 records detections by the sensors 102-110. The computing device 114 subsequently partitions or separates the recorded detections into time ranges of any suitable duration, such as about 30 seconds in length, about 1 minute in length, etc. Each time range comprises a document for which the computing device 114 generates a sensor vector. The sensor vector, in at least some examples, includes an identification of each of the sensors 102-110 that was triggered during the time window belonging to the document and a count of those triggers. As an example, an individual enters a house and walks down a hallway, triggering the sensor 106. The individual reaches and opens the door to the bedroom, triggering the sensor 104, and then enters the bedroom, triggering the sensor 108, and closes the door. The individual then opens the door to the bedroom again, triggering the sensor 104 for a second time and walks down the hallway to the bathroom, triggering the sensor 106 for a second time. The individual kicks an item on the floor of the hallway, triggering the sensor 110, before reaching and entering the bathroom, triggering the sensor 108. In the above example, assuming that the actions described occur in the same time range, an illustrative sensor vector may be [sensor102=1, sensor104=2, sensor106=2, sensor108=1, sensor110=1]. A count of each triggering of a sensor that appears in the sensor vector is a weight of that respective sensor.

After generating the sensor vector, the computing device 114 next generates a sensor-term vector based on the sensor-terms corresponding to the sensors indicated in the sensor vector and the weights of the sensors indicated in the sensor vector. Continuing the above example, the sensor-term vector may be [Bedroom=3, Bed=1, Door=2, Accelerometer=2, Contact=2, Hallway=3, Moving=2, Motion=4, Bathroom=1, Toileting=1, Bathing=1, Noise=1]. After generating the sensor-term vector, the computing device 114 normalizes the sensor-term vector based on one or more normalization factors determined according to any suitable normalization technique, as discussed above.

Figure 2:
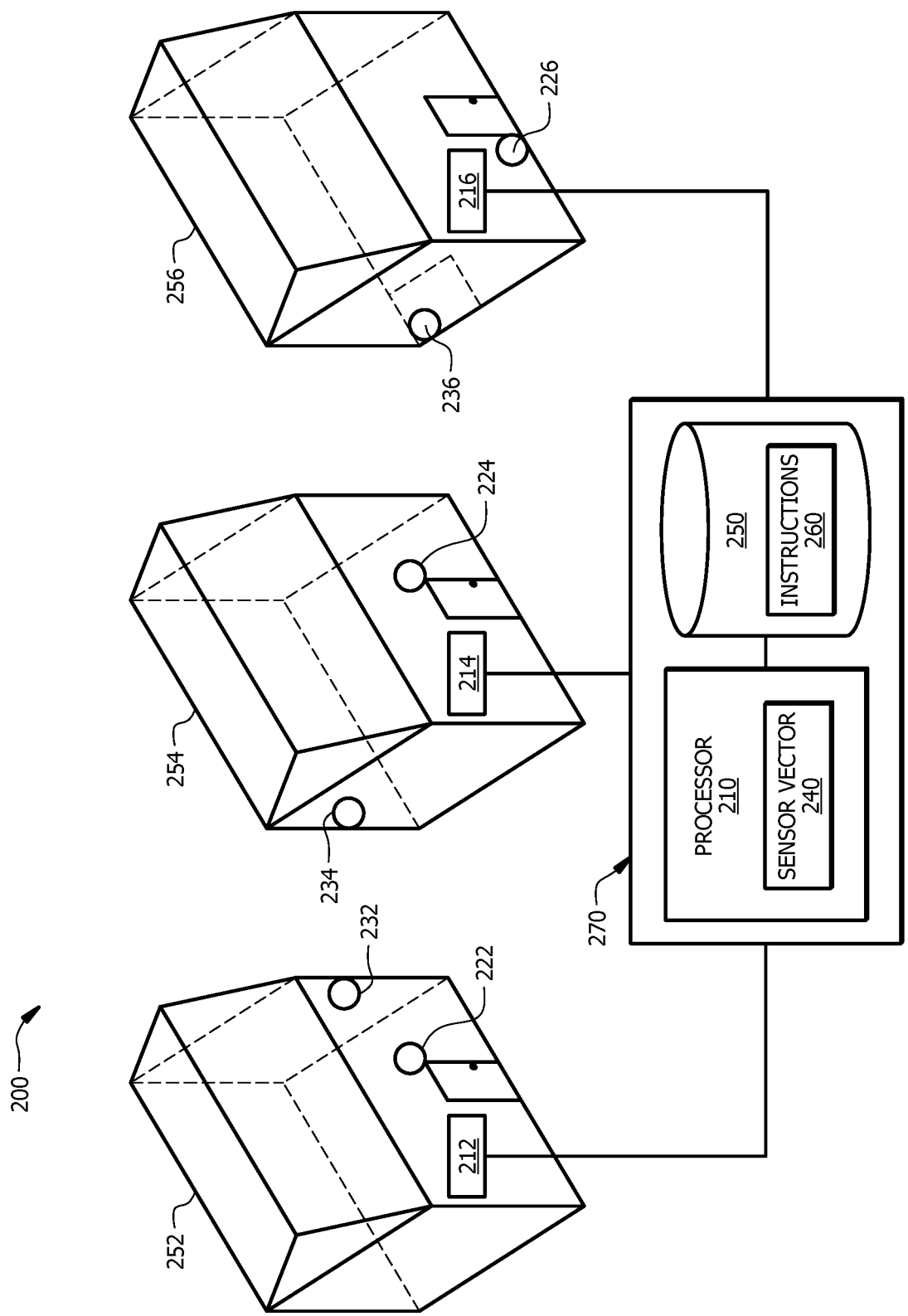
FIG. 2 shows a system in accordance with an example.

Turning now to FIG. 2, a diagram of an illustrative system 200 in accordance with an example is shown. In some implementations, the system 200 is representative of a machine learning system that preforms transfer learning, as discussed in FIG. 1 above. In at least some examples, the system 200 includes a first house 252, a second house 254, and a third house 256. In one such example, the first house 252 includes sensors 222 and 232 and a computing device 212. Sensor 222 may be a contact sensor that detects whether the front door is open or closed. Sensor 232 may be a motion sensor in the living room to detect the presence and any movement of an occupant. The second house 254 includes sensors 224 and 234 and a computing device 214. Sensor 224 may be a contact sensor that detects whether the front door is open or closed. Sensor 234 may be a motion sensor in the living room to detect the presence and any movement of an occupant. The floor plan of the second house 254 may be different than the floor plan of the first house 252. While sensors 232 and 234 are motion sensors in living rooms, the placement of the sensors 232 and 234 within the houses 252 and 254 may be different. One sensor may be placed at a corner while another is placed along a wall. The sensors 232 and 234 may be placed at different heights in the room, based on, for example, different ceiling heights. The third house 256 includes two sensors 226 and 236 and a computing device 216. Sensor 226 may be a photoelectric beam sensor that detects whether the front door is open or closed. Sensor 236 may be a motion sensor placed in a bathroom. Although described with respect to a different number of sensors, in at least one example the sensor network 100 may be implemented in the system 200 such that the implementation location discussed with respect to the sensor network 100 is implemented in one of the first house 252, the second house 252, or the third house 256. Additionally, although the houses 252, 254, and 256 are each described as having two sensors located in certain positions and having a computing device, in various examples any of the house 252, 254, and/or 256 can have more, or fewer, sensors placed in any suitable location.

The houses 252, 254 and 256 may include computing device 212, 214 and 216, respectively. The computing device 212, 214 and 216 may be part of home security or home monitoring systems for the houses 252, 254 and 256. The computing device 212, 214 and 216 may collect data from the sensors and provide the data to the computer system 270. The data may be collected and provided in real time, or the data may be collected and uploaded to the computer system 270 once an hour, once every X hours, where X is any non-zero integer, one a day, twice a day, every other day, once a week, or at any other regular or irregular interval. The computing device 212, 214 and, 216 or the computer system 270 may analyze the data from the sensors 222, 224, 226, 232, 234 and 236 to determine the status or activities of occupants of the houses 252, 254 and 256.

The computer system 270 includes at least a processor 210 and storage 250. The processor 210 may be coupled to the storage 250, such as via a bus. The storage 250 may include a hard drive, solid state drive (SSD), flash memory, electrically erasable programmable read-only memory (EEPROM), or random access memory (RAM). The storage 250 may store instructions 260 for execution by the processor 210. The instructions 260 may include instructions for assembling a sensor vector 240 from sensor data from a respective house from among the houses 252, 254, or 256 for comparison to a sensor vector from another respective house from among the houses 252, 254, or 256. The sensor vector 240 is depicted in the processor 210, as the processor 210 assembles the sensor vector 240. In various examples 210, the processor 210 may not store the sensor vector 240 in memory of the processor 210, but in storage 250. In at least some examples, the computer system 270 may be a component of a distributed computing system, such as a cloud computing node.

In various examples, sensors 232, 234 and 236 may have similar attributes, such as being motion sensors, however they may be placed in different locations in the house 252, 254 and 256. When interpreting activities of the occupants, activations of motion sensors may indicate an occupant is mobile or engaging in some activity, even when the motion sensors are in different rooms or different locations in rooms. The computer system 270 may gain insights into the activities of the occupants by considering activations of motion sensors 232, 234 and 236, even if the sensors 232, 234 and 236 are in different rooms or different locations in comparable rooms. Sensors 222, 224 and 226 may have similar attributes, such as sensing the state of front doors, even if sensors 222 and 224 are contact sensors and sensor 226 is a photoelectric beam sensor. The computer system 270 may gain insights into the activities of the occupants by considering activations of the door sensors 222, 224 and 226.

The computer system 270 may analyze the sensor vectors 240 across different time windows to identify patterns of occupants of the buildings. By building a common set of sensor-terms for the attributes, activations of sensors across different houses 252, 254 and 256 may be combined and analyzed together to provide additional data for a machine learning application instead of just analyzing the houses 252, 254 and 256 individually. This may reduce a training time for a machine learning application to learn patterns of behavior of the occupants. While each occupant may behave somewhat differently, some common behaviors may lead to common patterns of sensor activations. Such a cross-house analysis may be performed even when the houses 252, 254 and 256 may have different floor plans, different sizes, different numbers and types of rooms, different occupants, and different types and positioning of the sensors 222, 224, 226, 232, 234 and 236 due to the common set of sensor-terms used to define categories and attributes.

In various examples, after learning patterns of sensor activations, the computing device 212, 214 and 216 or computer system 270 may identify the state or activity of occupants of the houses 252, 254 and 256 based on the sensor activations in a time window or group of time windows. The computing device 212, 214 and 216 or computer system 270 may be able to identify states or activities, such as an occupant sleeping, showering, cooking, or watching TV. The sensor vectors may be used for the identification of activities as well as the machine learning of patterns. In learning the patterns, some human feedback may be provided to indicate the activities taking place during time windows. This may be done by an observer via a camera providing feedback to the machine learning regarding occupant status at various times or the occupant himself or herself keeping track of and reporting his or her activities.

In various examples, the computer system 270 may map the sensor vectors 240 to a multi-dimensional space, such as a latent space. This may be performed as part of the machine learning process. The operators of the computer system may specify a number of dimensions for the multi-dimensional space, which may be different than the number of attributes or number of categories specified for use with the sensor vectors 240. The root-mean-squared (RMS) distance between points in the latent space may be an indication of how closely related the machine learning application thinks the sensor vectors 240 or sensor activations may be. A sensor vector 240 may be mapped to a single arbitrary point in the latent space. Multiple sensor vectors 240 may be mapped to the latent space. The machine learning algorithm may map similar sensor vectors near each other in the latent space. The latent space may include some information regarding the time order of time windows for the sensor vectors 240. For example, the latent space may include information that corresponds to time-of-day or relative time adjacency information of at least some sensor vectors 240. Alternatively, in some examples the latent space and/or sensor vectors 240 do not include timing information. The computer system 270 may determine the RMS distance between points mapped into the latent space to identify clusters of data. The clusters of data may be identified for use by the machine learning application or a later machine learning application. Identification of clusters of data regarding the sensor vectors may result in faster machine learning of the patterns in the data than having the machine learning process the raw data from the sensors.

Figure 3:
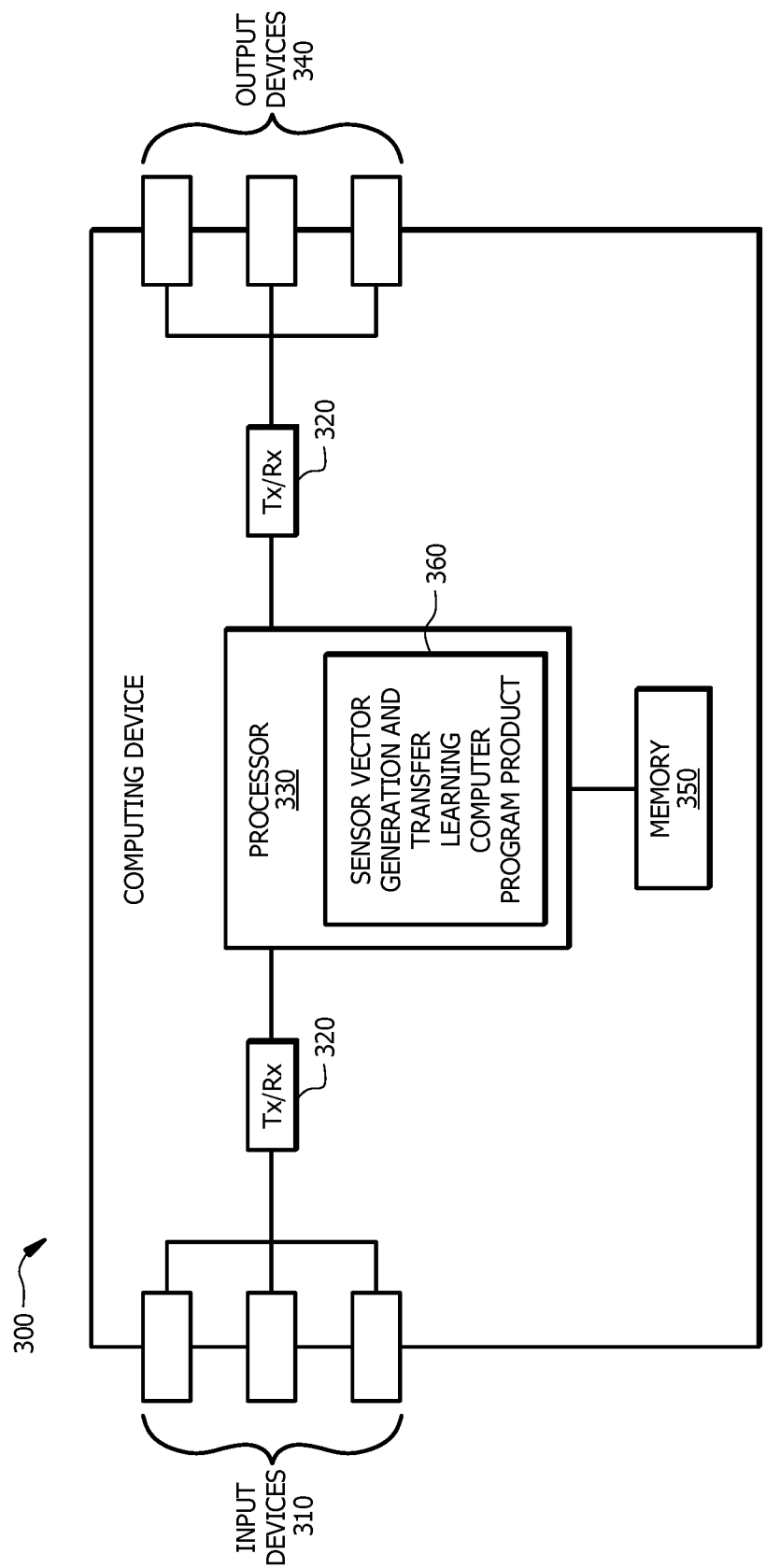
FIG. 3 shows a block diagram of a computing device in accordance with an example.

Turning now to FIG. 3, an illustrative block diagram of a computing device 300 in accordance with an example is shown. In at least some examples, the computing device 300 is suitable for implementing any one or more of the computing device 114 of FIG. 1, the computing device 212, the computing device 214, the computing device 216, and/or the computer system 270, each of FIG. 2. Computing device 300 may be any suitable processing device capable of performing the functions disclosed herein such as a computer system, a server, a cloud computing node, or may be generally representative of a distributed computing device in which one or more components of computing device 300 are distributed or shared across one or more other devices. Computing device 300 is configured to implement at least some of the features/methods disclosed herein, for example, the sensor vector generation and/or transfer learning discussed above. The features/methods of this disclosure are implemented using hardware, firmware, and/or software installed to run on hardware. Computing device 300 may be further configured to operate within the cloud computing environment 50, discussed below with respect to FIGS. 5 and 6.

The computing device 300 comprises one or more input devices 310. Some of the input devices 310 include at least some of cameras, magnetic sensors, temperature sensors, pressure sensors, accelerometers, microphones, keyboards, touchscreens, buttons, toggle switches, and/or other devices that allow a user to interact with, and/or provide input actively or passively to, the computing device 300. Some other of the input devices 310 are downstream ports coupled to a transceiver (Tx/Rx) 320, which are transmitters, receivers, or combinations thereof. The Tx/Rx 320 transmits and/or receives data to and/or from other computing or electronic devices via at least some of the input devices 310. Similarly, the computing device 300 comprises a plurality of output devices 340. Some of the output devices 340 include at least some of speakers, a display screen (which, in some examples, is also an input device such as a touchscreen), lights, or any other device that allows a user to interact with, and receive output from, the computing device 300. At least some of the output devices 340 are upstream ports coupled to another Tx/Rx 320, wherein the Tx/Rx 320 transmits and/or receives data from other nodes via the upstream ports. The downstream ports and/or the upstream ports include electrical and/or optical transmitting and/or receiving components. In another embodiment, the computing device 300 comprises one or more antennas (not shown) coupled to the Tx/Rx 320. The Tx/Rx 320 transmits and/or receives data from other computing or storage devices wirelessly via the one or more antennas. In yet other embodiments, the computing device 300 includes additional Tx/Rx 320 such that the computing device 300 has multiple networking or communication interfaces, for example, such that the computing device 300 communicates with a first device using a first communication interface (e.g., such as via the Internet) and communicates with a second device using a second communication interface (e.g., such as another computing device 300 without using the Internet).

A processor 330 is coupled to the Tx/Rx 320 and at least some of the input devices 310 and/or output devices 340 and is configured to implement the risk back testing framework. In an embodiment, the processor 330 comprises one or more multi-core processors and/or memory modules 350, which functions as data stores, buffers, etc. The processor 330 is implemented as a general processor or as part of one or more application specific integrated circuits (ASICs), field-programmable gate arrays (FPGAs), and/or digital signal processors (DSPs). Although illustrated as a single processor, the processor 330 is not so limited and alternatively comprises multiple processors. The processor 330 further comprises processing logic configured to execute a sensor vector generation and transfer learning computer program product 360 that is configured to implement the sensor vector generation and transfer learning as described above with respect to the sensor network 100, the system 200, or below with respect to the method 400.

In at least some examples, the sensor vector generation and transfer learning computer program product 360 includes instructions that when executed by the processor 330 are configured to calculate sensor activations corresponding to sensor attributes. The instructions of the sensor vector generation and transfer learning computer program product 360 may cause the processor 330 to calculate a first number of activations of a first set of sensors corresponding to a first sensor attribute, the first number of activations taking place in a time window. The instructions of the sensor vector generation and transfer learning computer program product 360 may cause the processor 330 to calculate a second number of activations of a second set of sensors corresponding to a second sensor attribute, the second number of activations taking place in the time window, wherein the first set of sensors overlaps the second set of sensors, wherein the first set of sensors and the second set of sensors monitor a location. Executing the instructions of the sensor vector generation and transfer learning computer program product 360 may cause the processor 330 to identify a pattern based on the first number of activations and the second number of activations, the pattern corresponding to an activity taking place at the location.

In various examples, executing the instructions of the sensor vector generation and transfer learning computer program product 360 may cause the processor 330 may associate sensors with attributes or assign sensors to sets of sensors based on attributes of the sensor. This may be part of a manual process where a user associates the attributes with sensors. In various examples, the sensors may be programmed with the information and communicate the information, such as part of a setup or configuration process.

In various examples, executing the instructions of the sensor vector generation and transfer learning computer program product 360 may cause the processor 330 to normalize the sensor activation counts based on occupancy or size of a location. Based on the transfer learning, one or more insights may be derived. For example, for a single occupant, five activations of a bed sensor during a 30 second time window may indicate restlessness while an occupant tries to fall asleep. For two occupants, five activations may indicate a normal amount of movement while asleep or trying to fall asleep. A larger house may have more sensor activations in a time window as an occupant is moving from one room to another, because a bedroom and a kitchen may be further away in a large house versus a small house. Occupancy and size considerations may also affect the interpretation of patterns across multiple time windows. Eight toilet activations in a day may indicate a potential issue for a single occupant but be within an expected total for two occupants. Other insights at least partially derivable from executing the transfer learning of the sensor vector generation and transfer learning computer program product 360 may also be determined.

FIG. 3 also illustrates that a memory module 350 is coupled to the processor 330 and is a non-transitory medium configured to store various types of data. Memory module 350 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 houses the instructions for carrying out the various embodiments described herein. For example, the memory module 350 comprises the sensor vector generation and transfer learning computer program product 360, which is executed by processor 330.

It is understood that by programming and/or loading executable instructions onto the computing device 300, at least one of the processor 330 and/or the memory module 350 are changed, transforming the computing device 300 in part into a particular machine or apparatus, for example, an data verification system for implementing a risk back testing framework having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change is preferred to be implemented in software, because re-spinning a hardware implementation is more expensive than re-spinning a software design. Generally, a design that is stable and will be produced in large volume is preferred to be implemented in hardware (e.g., in an ASIC) because for large production runs the hardware implementation is less expensive than software implementations. Often a design is developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions is a particular machine or apparatus.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language, and functional programming languages such as Haskell or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
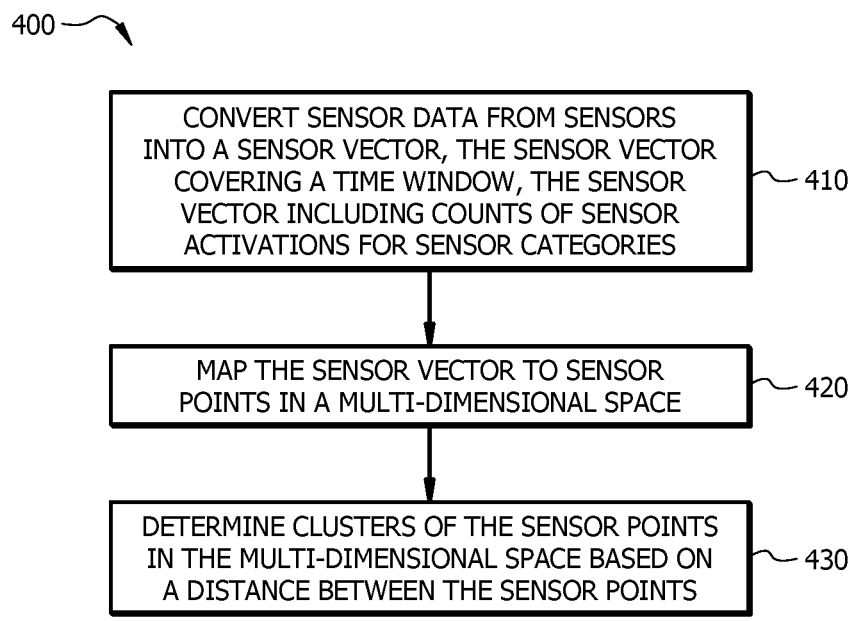
FIG. 4 shows a method of converting sensor data into a sensor vector and mapping the sensor vector to a multi-dimensional space in accordance with an example.

Turning now to FIG. 4, a flowchart of an illustrative method 400 in accordance with an example is shown. In at least some examples, the method 400 is a method of converting sensor data into a sensor vector and mapping the sensor vector to a multi-dimensional space. The method 400 is implemented, in some examples, by a computing device such as the computing device 114 of FIG. 1 and/or a computer system such as the computer system 270 of FIG. 2. More generally, in at least some examples the method 400 is a method for sensor vector generation and transfer learning, as discussed in greater detail elsewhere herein. In at least some examples, operation 410 includes converting sensor data from sensors into a sensor vector, the sensor vector covering a time window and including counts of sensor activations for sensor categories. At operation 420, the sensor vector is mapped to sensor points in a multi-dimensional space. At operation 430, clusters of the sensor points in the multi-dimensional space are determined based on a distance between the sensor points.

Based on the clusters generated at operation 430, activities of the various occupants of a facility type may be identified. The activities may follow a pattern which is less applicable to other facility types. An occupant of a home may have a pattern regarding toileting, while an occupant of a skilled nursing facility may be bedridden and use bedpans. Including attributes related to facility type may allow the machine learning according to the present disclosure to distinguish between patterns unique to different facilities. Other patterns may be comparable across facility types. For example, the television viewing habits of individuals in independent or assisted living facilities may be comparable. Machine learning of patterns may take place across different facilities at least partially due to the inclusion of attributes designating the facility type and the attributes of the different sensors.

In various examples, the location of the sensors (e.g., the facility type) may be something other than a dwelling. For example, the sensors may be located at a school, a library, a stadium, a park, or a campground. Sensor data may be aggregated across these different location or facility types and analyzed by a machine learning system. Use of an attribute to designate the type of location may increase the accuracy of patterns matched by the machine learning system. While aggregating dwelling information from multiple dwellings may provide better pattern matching, some patterns may be also found across different location or facility types.

Additionally, activities being performed by the occupants of dwellings or other facility types may be determined based on the sensor data. Alerts may be then issued based on the activities. For example, if the sleeping schedule of an occupant changes, an occupant is not eating enough, moving around enough, or showering or toileting enough, an alert may be issued. Issuance of an alert may occur for any deviation, such as whenever an occupant misses a meal, or based on an accumulation of data, such as waking up later in the day across the course of multiple days. The alerts may indicate a check-up on the occupant should be performed. Such alerts may also identify when an occupant has fallen and may be unconscious or unable to move. Such alerts may also identify when an occupant may be sick. Corrective steps may be taken in response to the alerts, such as dispatching emergency personnel, contacting another individual, or scheduling a nurse or doctor's visit.

Figure 5:
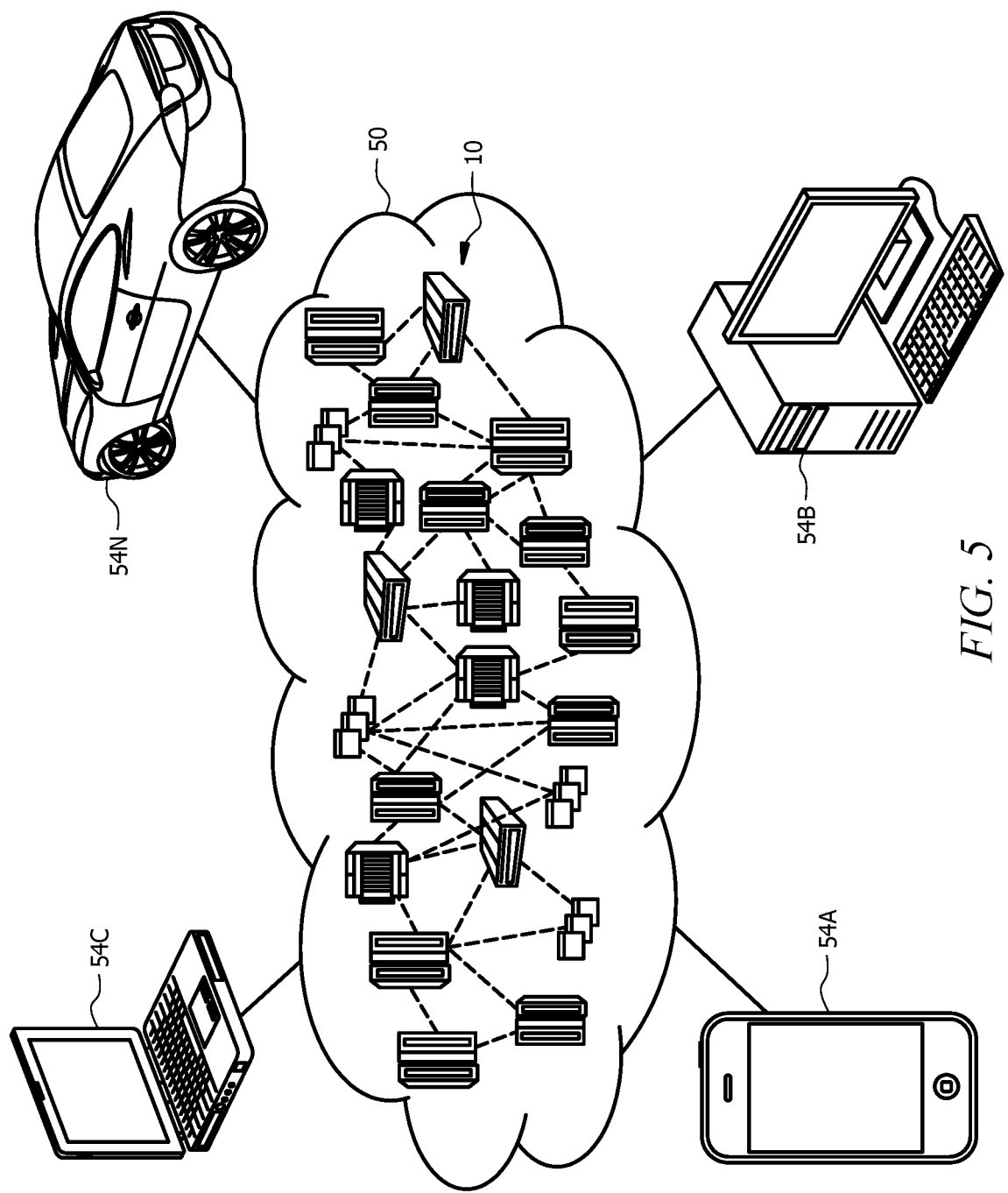
FIG. 5 shows a diagram of a cloud-computing environment in accordance with an example.
Figure 6:
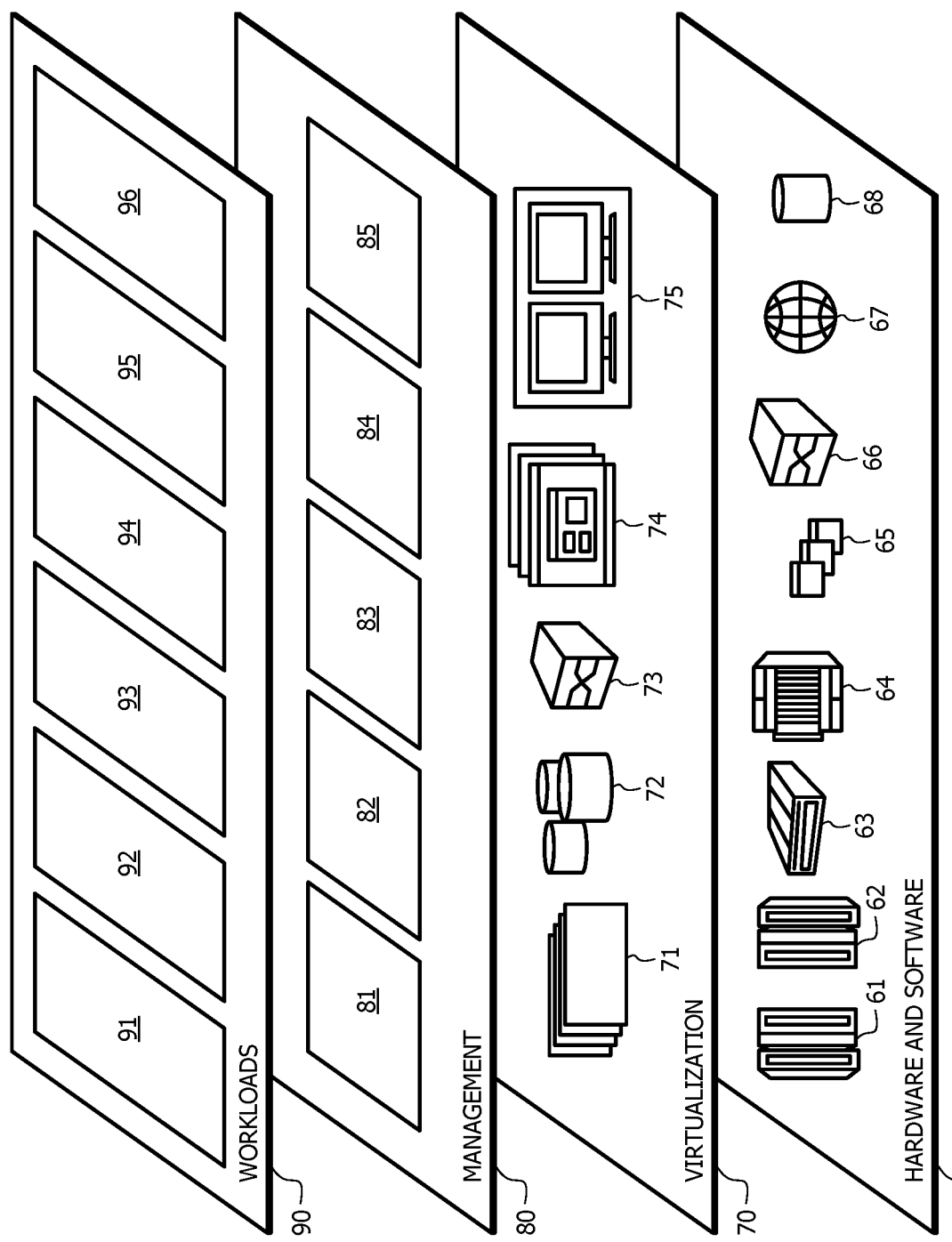
FIG. 6 shows a diagram of abstraction model layers in accordance with an example.

Turning now to FIGS. 5 and 6, it is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; Reduced Instruction Set Computer (RISC) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor vector generation and transfer learning 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about," "approximately," or "substantially" preceding a value means+/−10 percent of the stated value or reference.

What is claimed is:

1. A system comprising:
a first sensor associated with a first attribute and a second attribute;
a second sensor associated with the first attribute and a third attribute; and
a processor communicatively coupled to the first sensor and to the second sensor, the processor configured to:
identify a number of activations of the first sensor within a time window;
identify a number of activations of the second sensor within the time window; and
construct a sensor vector identifying:
a number of first attribute activations based on the number of activations of the first sensor;
a number of second attribute activations based on the number of activations of the first sensor and the number of activations of the second sensor; and
a number of third attribute activations based on the number of activations of the second sensor, wherein the sensor vector includes the first attribute with a first assigned value equal to the number of activations of the first sensor, the second attribute with a second assigned value equal to the number of activations of the first sensor and the number of activations of the second sensor, and the third attribute with a third assigned value equal to the number of activations of the second sensor.

2. The system of claim 1, further comprising:
a first set of sensors at a first location, the first set of sensors including the first sensor and the second sensor with sensors in the first set of sensors mapping to an attribute set and the attribute set including the first attribute, the second attribute, and the third attribute, wherein the mapping of the first set of sensors includes the association of the first sensor with the first attribute and the second attribute and the association of the second sensor with the first attribute and the third attribute; and
a second set of sensors at a second location, the second set of sensors including a third sensor associated with the first attribute and the third attribute with sensors in the second set of sensors mapping to the attribute set, wherein the mapping of the second set of sensors includes the association of the third sensor with the first attribute and the third attribute, and wherein the processor is configured to:
construct the sensor vector based on a number of activations of sensors in the first set of sensors; and
construct a second sensor vector based on a number of activations of sensors in the second set of sensors.

3. The system of claim 1, wherein the first sensor and the second sensor are in a building, and wherein the processor identifies a state of an occupant of the building based on the sensor vector.

4. The system of claim 2, wherein the first location is a first building and the second location is a second building, and wherein the processor is configured to identify a pattern corresponding to activities of occupants of the first building and the second building.

5. The system of claim 1, wherein the processor is configured to map the sensor vector to a set of points in a multi-dimensional space.

6. The system of claim 5, wherein the processor is configured to:
map a second sensor vector to a second set of points in the multi-dimensional space, wherein the second sensor vector corresponds to activations of the first sensor and the second sensor in a second time window; and
identify a cluster of points from the set of points and the second set of points, wherein the identification is based on a root-mean-squared (RMS) distance between the points in the set of points and the second set of points.

7. The system of claim 6, wherein the processor is configured to provide the cluster of points to a machine learning application for training the machine learning application.

8. A computer program product comprising a computer readable storage medium having program instructions embodied therewith, the program instructions executable by a processor to cause the processor to:
calculate a first number of activations of a first set of sensors corresponding to a first sensor attribute, wherein the first number of activations takes place in a time window;
calculate a second number of activations of a second set of sensors corresponding to a second sensor attribute, wherein the second number of activations take place in the time window, wherein the first set of sensors overlaps the second set of sensors, and wherein the first set of sensors and the second set of sensors monitor a location;
generate a sensor vector that includes the first sensor attribute with a first assigned value equal to the first number of activations of the first set of sensors and the second sensor attribute with a second assigned value equal to the second number of activations of the second set of sensors; and
identify a pattern based on the sensor vector including the first number of activations and the second number of activations, wherein the pattern corresponds to an activity taking place at the location.

9. The computer program product of claim 8, wherein the machine-readable instructions, when executed by the processor, further cause the processor to issue an alert based on the activity.

10. The computer program product of claim 8, wherein the machine-readable instructions, when executed by the processor, further cause the processor to:

assign a first sensor to the first set of sensors based on the first sensor including a motion sensor; and assign a second sensor to the second set of sensors based on the first sensor being in a bedroom of the location.

11. The computer program product of claim 8, wherein the identification of the pattern includes adjusting the first number of activations and the second number of activations based on an occupancy count of the location.

12. The computer program product of claim 8, wherein the pattern indicates an occupant of the location is sleeping.

13. The computer program product of claim 8, wherein the identification of the pattern includes causing the processor to map the first number of activations and the second number of activations to a multi-dimensional space.

14. A method comprising:

converting sensor data from sensors each associated with multiple sensor categories into a sensor vector including data spanning a time window, wherein the sensor vector includes a count of sensor activations for a first sensor category of the multiple sensor categories and a count of sensor activations for a second sensor category of the multiple sensor categories;

mapping the sensor vector to sensor points in a multi-dimensional latent space; and determining clusters of the sensor points in the multi-dimensional latent space based on a distance between the sensor points in the multi-dimensional latent space.

15. The method of claim 14, further comprising:

defining the sensor categories based on attributes of the sensors; and creating a sensor map based on the sensor categories and the attributes of the sensors, wherein the sensor map correlates the sensors to the sensor categories based on the attributes of the sensors, and wherein converting the sensor data from the sensors into the sensor vector is based on the sensor map.

16. The method of claim 14, further comprising creating a sensor map correlating the sensors to the sensor categories.

17. The method of claim 14, wherein the sensor categories includes a facility category, and a room category, the facility category including a home attribute and an assisted living attribute, wherein the room category includes a bedroom attribute and a bathroom attribute, wherein the sensor map associates a first sensor of the sensors with the home attribute and with the bedroom attribute, and wherein the sensor map associates a second sensor of the sensors with the home attribute and with the bathroom attribute.

18. The method of claim 14, wherein the sensor data originates from multiple dwellings, wherein the dwellings includes a first dwelling with a first floor plan and a second dwelling with a second floor plan, and wherein the first floor plan differs from the second floor plan.

19. The method of claim 18, further comprising:

providing the clusters of sensor points to a machine learning application that determines activities of occupants of the dwellings; and identifying an activity of an occupant of the first dwelling based on sensor data from the first dwelling and the machine learning application.

20. The method of claim 19, further comprising issuing an alert based on the activity.

* * * * *